United States Patent Office 3,479,312
Patented Nov. 18, 1969

3,479,312
CONTINUOUS SOLUTION-POLYMERIZATION OF ACRYLONITRILE
Saburo Fujii and Masatoshi Yoshida, Kitajima-machi, Japan, assignors to Toho Beslon Kabushiki Kaisha, Tokyo, Japan, a corporation of Japan
No Drawing. Filed Dec. 3, 1965, Ser. No. 511,315
Claims priority, application Japan, Dec. 9, 1964, 39/68,800; Dec. 10, 1964, 39/69,126
Int. Cl. C08f 1/06, 1/08, 3/76
U.S. Cl. 260—29.6  9 Claims

ABSTRACT OF THE DISCLOSURE

A process in which an acrylic polymer solution is made from a monomer solution comprising at least 85% acrylonitrile in a concentrated aqueous salt solution of zinc chloride. In the process, the monomer solution is precooled to 5–15° C. and continuously fed with a polymerization initiator into the first of series of reactors each maintained at 35°–65° C., but with each successive reactor at a higher temperature than its predecessor. Each reactor is also provided with cooling means set at above 15° C. and also at a temperature which is within 30° C. of its associated reactor. Polymerization is effected in the first reactor to the extent of 60–85% and the product is transferred to at least a second reactor to continue polymerization to a final conversion of at least 92%.

---

The present invention relates generally to a process for the homogeneous solution-polymerization of acrylonitrile monomer or unsaturated monomer mixtures containing at least 85% by weight of acrylonitrile in a solvent of concentrated aqueous solution of either zinc chloride or a mixture thereof with a chloride of another metal, and more particularly to a novel and useful improvement of a process for the continuous solution-polymerization of acrylonitrile mixtures in a highly viscous state, the mixtures consisting of pre-formed polymers and the solvent heretofore referred to.

Heretofore there have been made various efforts in respect of polymerization of acrylonitrile or mixtures thereof with other unsaturated monomers in aqueous media. There have been, however, various troubles or unsolved problems encountered in commercially carrying out continuous solution-polymerization of acrylonitrile and in continuously spinning the resulting polymer solution in situ. In order to prepare an acrylonitrile polymer, by solution-polymerization, which is suitable for obtaining shaped products of excellent physical properties it is necessary to carry out the polymerization as homogeneously as possible.

However, in the polymerizing the acrylonitrile system as referred to, with the use of an aqueous solution of zinc chloride or a mixture of zinc chloride and a chloride of an alkali or alkaline-earth metal as a reactor solvent, the polymerization velocity has been found to be considerably accelerated in contrast to the case wherein there is used a reaction medium, for instance, an aqueous thiocyanate solution, or an organic solvent such as ethylene carbonate, dimethyl formamide and the like. Thus, it is not easy to proceed with such a rapid reaction in a high viscosity medium while keeping the reaction temperature constant and controlling the bulk viscosity of the resultant solution in a desirable narrow range. On the other hand, it is preferable from the viewpoint of industrial scale production to form fibers or films by extruding the obtained polymer solution in situ and directly into a coagulating bath without treatments such as separation of the unreacted monomer, deaeration and the like, since the process steps can be simplified. In order to attain such purpose, both the average molecular weight and the concentration of the polymer formed in the solution as well as the final conversion must respectively be selected within a particular range so as to obtain useful fiber or film, and thus the polymer solution having such charactristics is generally in a highly viscous state. That is to say, the solution-polymerization reaction must be carried out in highly a viscous solution. Under such conditions, the distribution of the concentration of reactants and of temperature in the reaction medium is liable to become non-uniform, and an abnormal local temperature rise tends to occur which may cause discoloration of the resulting polymer and formation of undesirable by-products. In order to avoid such disadvantages or faults, the industrial scale continuous solution-polymerization of the type referred to above has resulted in a final conversion from monomer to polymer of up to 70–80%; with separation of the unreacted monomer from the resulting polymer solution before subjecting it to a spinning operation.

This invention contemplates providing an improved method of continuous solution-polymerization wherein the resulting polymer solution of which the conversion from monomer to polymer is at least 92%, more preferably 95% or more, is extruded directly and in situ into a coagulating bath to obtain shaped products of excellent physical properties.

According to the present invention, there is used an apparatus comprising a plurality of reactors, arranged in series and connected to each other with pipes, each of which has a jacket for cooling or heating the reaction solution and a stirred for agitating the reaction solution. The first of said reactors is supplied continuously with a monomer solution and a polymerization initiator solution respectively at constant charge rates. The monomer solution consists of a concentrated aqueous solution mainly of zinc chloride, acrylonitrile and, if desired, a small amount of an unsaturated monomer copolymerizable with acrylonitrile. The reaction mixture in the first reactor is continuously transferred to the second, and if desired, to further subsequent reactors. If necessary, at each stage more additive of initiator solution is introduced while selecting a reaction temperature in each reactor higher than that of the preceding reactor. By carrying out the reaction in each reactor step by step so that both the average conversion from monomer to polymer and the average molecular weight of the polymer formed in the respective reactor may be regulated respectively within a particular range, the reaction is finally completed in the last reactor in a given time. By effectively controlling the viscosity and temperature of the reaction liquid in each reactor, the resulting polymer solution, wherein the final conversion is above 92%, may be in situ and directly extruded into a coagulating bath so as to obtain shaped products of excellent physical properties.

Since the polymer solution obtained in accordance with the present invention should be in situ and directly used for producing shaped products such as fibers, filaments and the like, the characteristics of the polymer solution will naturally exert a considerable influence upon some of the physical properties of the shaped products, and accordingly, the desirable conditions for the polymer solution are specified below.

For instance, in order to obtain acrylic fiber of excellent physical properties by using a spinning dope composed of acrylonitrile polymer and an aqueous saline solvent containing mainly zinc chloride, the Staudinger's molecular weight of the polymer should preferably be in the range of $6 \times 10^4$ to $8 \times 10^4$ and the polymer concentration in the spinning dope from 7 to 11 weight percent. Furthermore, it is preferable that there remains little unreacted monomer in the spinning dope. The final conversion by the practice of the instant process is at least 92%, more preferably 95%. Since the viscosity of such a polymer solution will be at least about 50 seconds, usually above 70 seconds, when expressed as the falling time of a steel ball of ⅛ in. diameter through a vertical distance of 20 cm. in a sample solution at a temperature of 45° C., it will be difficult to expect very rapid and completely homogeneous mixing of the fed monomer solution of low viscosity with the polymer solution of such high viscosity, even if the reaction system is vigorously agitated, and, consequently, the monomer will suddenly undergo a locally heterogeneous post-polymerization upon introduction of the initiator, which causes various disadvantages such as formation of undesirable by-products, thermal decomposition etc.

Such tendency is markedly accelerated when the polymerization is carried out at a relatively lower temperature. Considering, for example, that the viscosity of the polymer solution at temperatures near 30° C. is at least 75 seconds, usually above 100 seconds, it will be obvious that the undesirable tendency mentioned above is accelerated with a decrease of the polymerization temperature. Furthermore, it has been found that as the polymerization progresses the polymer concentration is raised such that the polymer viscosity is increased at the rate of 4th to 5th power of said concentration increase rate.

In the present invention there is used a reaction apparatus comprising two or more reactors arranged in series so as to carry out continuous polymerization wherein the conversion from monomer to polymer in the reaction liquid in the first reactor is not higher than 85% and the remaining polymerization is effected in the second, and, if necessary, subsequent reactors. By controlling the conversion rate in the first reactor, the viscosity of the reaction liquid is kept low enough to promote the admixture efficiency of said liquid with the liquid supplied continuously to said first reactor. By carrying out most of the polymerization at this relatively lower viscosity of solution, most of the heat generated during the reaction is absorbed and the remaining polymerization is continued in a relatively more viscous solution in the second, and, if desired, subsequent reactors so as to prepare a homogeneous polymer solution possessing high final conversion while preventing the faults accompanying the rise of reaction liquid viscosity as referred to above.

Another reason the polymerization conversion is suppressed to approximately not over 85% in the first reactor is that if it is higher than the said value the viscosity of the reaction liquid is considerably effected by fluctuations in charge rate of the monomer solution and of the polymerization initiator solution or by a fluctuation in content of impurities in the said two solutions, which is undesirable for the operation.

Although such viscosity fluctuation has not yet been completely explained, one of the reasons may be considered as follows. As described in pp. 410–416 of the text book "Physical Chemistry of High Polymeric Systems" by H. Mark and A. V. Tobolsky (1955), the degree of polymerization, $\bar{P}$, of the polymer obtained under conditions wherein monomer concentration is [M], concentration of the polymerization initiator is [I] and concentration of such additives and/or impurities as cause chain transfer is [C], may be represented by the equation;

$$\frac{1}{\bar{P}} = \frac{(\alpha K_d \cdot [I])^{1/2}}{K_p \cdot [M]} + \frac{k_{tr} \cdot [C]}{k_p \cdot [M]} + \beta$$

wherein $K_d$, $K_p$, $K_t$, and $K_{tr}$ represent the rate constants of initiator decomposition, chain propagation, chain termination and chain transfer by regulator or impurity respectively; $\alpha$ represents the inititator efficiency for producing polymer radical; and $\beta$ is a specific constant. When the magnitude of $\beta$ is very small as compared with those of the first and second terms in the right side of the above equation, the smaller is [M] the smaller [I] or [C] or they both must be adjusted in order to hold the desirable magnitude of $\bar{P}$. In other words, when the conversion is substantially over 85% in a single reactor for continuous polymerization most of the polymer is produced under conditions wherein the steady state concentration of the monomer in the reactor is considerably small, and consequently, [I] or [C] or both will have to be correspondingly smaller, in which case $\bar{P}$ will be more sensitively affected by the fluctuations of [M], [C] and [I] in the reactor than in the case wherein [M] is relatively larger. In an industrial scale of continuous polymerization, it is difficult to keep the magnitudes of [M], [I] and [C] strictly constant in the reactor for an extended time period. Some fluctuation or variation is inevitable in the rates of charging monomer and initiator solutions and also in the concentration of impurities contained in the aqueous saline solvent for polymerization. In order to keep the viscosity of the resulting polymer solution within a particular range, accordingly, it was found necessary to use a plurality of reactors arranged in series, to adjust the conversion in the first reactor to a range wherein [M] is not lowered beyond a limited magnitude, and then to continue the polymerization in the second and subsequent reactors in such a manner that the relationship of the polymer formed in the later stage of the polymerization on the bulk viscosity of the final solution is relatively small.

We have found that it is necessary to control the final viscosity within a small deviation of ±5% from a desired magnitude in order to assure that the properties of the shaped articles, such as fibers, produced continuously from the finally resulting polymer solution are kept constant. Furthermore, it has also been found that the conversion in the first reactor should be kept substantially not over 85% and, more preferably, not over 80% in order to keep the viscosity of the polymer solution, which is being continously produced, within said small deviation range, When a considerable amount of polymer is produced in the first reactor, the bulk viscosity of the polymer solution finally formed in the last reactor is dependent mainly on that in the first reactor. Even if the unreacted monomer entering the second and subsequent reactors is polymerized therein, causing some fluctuation in the degree of polymerization of the polymer formed, it will not considerably influence the final viscosity of the polymer solution, since the polymer formed in the second and subsequent reactors is of a relatively small amount. It is preferable to keep the conversion in the first reactor constant within a range not exceeding 85%.

The number of reactors to be used for carrying out the present invention must be at least two. Six or more reactors may be used, but using too many reactors will not be desirable from a commercial viewpoint since it is necessary to provide very expensive glass lined reactors to protect them against the strong corrosive action of zinc chloride. Thus, it is preferable to use two to five reactors arranged in series.

The conversion in the first reactor is preferably controlled to at least 60%, and preferably 70% or more, in order to use the first reactor effectively.

The capacity of the reactor may be determined by considering the rate of charging the monomer solution, the kind and amount of polymerization initiator, the concentration of monomer in the solution, the polymerization temperature, etc. It is generally preferable to select the capacity of the reactor so that the average reaction time in each reactor is 1–3 hours. The present invention is most effective in rapid polymerization where the conversion being attained is over at least 92% within a time less than 15 hours and more preferably less than 10 hours.

It is preferable to use a closed reactor with connecting pipes through which the reactant system to be polymerized, the resulting polymer solution and/or other liquids to be supplied, such as initiator or molecular weight regulator solution, are forced to flow, respectively, whereby there is no empty space left in the reactor and pipes connecting the reactors, or, in other words the reactor is completely filled with the solution containing monomers to be polymerized, and polymer.

Considering the temperature relationship of bulk viscosity of acrylonitrile polymer solution, the reaction temperature in the present invention is preferably kept at above 35° C. in order to prevent the viscosity of the reaction system becoming extremely high with increasing conversion. However, the reaction temperature through the whole reaction must not exceed 65° C., and it is preferable not to exceed 60° C. Although a higher temperature may have an advantage in lowering the bulk viscosity, it causes some undesirable chemical change or discoloration of the polymer formed, which results in deterioration of the quality of the shaped products. Above all, in the first reactor wherein unreacted monomer and polymerization initiator exist in a relatively higher concentration, the reaction temperature preferably does not exceed 55° C. in order to prevent any formation of discolored products due to an undesirable side-reaction between the initiator and the monomer or the polymer at the higher temperature. It is preferable to set the temperature of the second reactor somewhat higher than that of the first reactor in the range referred to above and if necessary to raise the temperatures of the second and subsequent reactors in steps, because the increase of the bulk viscosity of the reaction system passing through those reactors, while increasing the conversion, will be considerably avoided and also the thermal balances of each of those reactors can be realized without having the cooling jacket-water extremely cooled.

As referred to above, it is necessary to select conditions for polymerization in the first reaction vessel, such as polymerization temperature, the charge rates and concentrations of monomer material and initiator etc., so as to keep the conversion in a steady state in said first reactor within a range of 60–85%, more preferably 70–80%. From the first reactor, the polymer solution containing a residual amount of the monomers is forced to continuously flow through the second and subsequent reactors of which the temperatures are established of at least 35° C. and below 65° C., more preferably not over 60° C., and then the polymerization is substantially completed in the last reactor.

In continuous polymerization with a series of reactors having agitators and cooling jackets, a usual method for keeping the reaction temperatures constant is to control the flow rate or temperature of the jacket-water for each of the reactors used, when the other operating conditions as well as the reaction conditions have been all fixed. It is natural that the cooling effect by means of a jacket is increased by lowering the temperature of the jacket-water. However, in the continuous solution-polymerization of the system comprising mainly acrylonitrile monomer and zinc chloride in aqueous solution, we have found that gel-like polymer pieces are deposited and continue to grow on the inner wall surfaces of the reactors, especially on those of the first and second reactors during the long time the jackets are kept at a low temperature or the temperature difference between the inner reaction solution and the jacket of the reactor is kept large. Such undesirable generation and growing of gel-like polymer pieces result not only in a decrease of the cooling efficiency by the jacket but also a deterioration of the quality of the polymer solution since some of the gel-like pieces are re-dissolved imperfectly in the solution. Furthermore, it has been found that some of the gel-like pieces are transferred to adhere to the inner wall of the pipes connecting the reactors and then often grows to block the pipes, which may make it impossible to continue the polymerization operation. Such a phenomenon can not be anticipated in the case of a usual homogeneous solution polymerization. The undesirable information of such gel-like substance, however, can be suppressed in accordance with the present invention wherein a plurality of reactors with cooling jackets are used in such a manner that the polymerization conditions in steady state of each of the reactors are selected under limits so as to keep the jacket temperature in a specific range as described below, and that a considerable part of the overall polymerization is carried out in the first reactor where the bulk viscosity of the solution is kept relatively low.

In this connection, we have found that said faults can be prevented by holding the jacket temperatures above 15° C. and the temperature difference between the reaction system and jacket of each of the respective reactors within 30° C.

In order to repair the shortage of cooling ability, it is preferable to cool the monomer solution as well as possible before supplying it to the first reactors, so as to absorb the polymerization heat to be generated in the reactor. However, if it is cooled substantially below 5° C. in the continuous long running operation, inorganic sulfates possibly contained as impurities in the monomer solution are crystallized or precipitated, and which may lower the cooling efficiency of the equipment for controlling the temperature of the monomer solution, or disturbs the normal operation of the pressure pump for feeding the cooled monomer solution into the first reactor.

If the saline solvent containing mainly zinc chloride for polymerization has been previously purified so that sulfate ion content in the solvent is lowered down below 0.05% by weight, the monomer solution can be cooled to approximately 0° C. so as to solve the faults as referred to above. However this is not desirable since such a highly strict purification of the solvent requires troublesome treatments which are expensive and not easily controlled. Thus, it is preferable to select the temperatures of the monomer solution being fed to the reactor at least not below 5° C. on one hand to be and on the other hand lower than the temperature of the reaction liquid by 25° C. or more in the first reactor for the purpose of controlling the reaction temperature in said reactor, and preferably at a temperature of 5 to 15° C.

In the present invention one medium which may be used for polymerization is a concentrated aqueous solution of a mixture of a chloride or chlorides of sodium, magnesium or calcium in addition to zinc chloride as a main component so far as the composition and concentration of said mixture are such as that is possible not only to dissolve the unsaturated monomers comprising at least 85% of acrylonitrile as well as a copolymer formed therefrom at room temperature, but also to form a stable and homogeneous polymer-monomer mixture.

Any unsaturated compound may be used as the comonomer in this invention so long as it can be copolymerized with acrylonitrile and that the resulting acrylonitrile copolymer can be stably dissolved in the aqueous solution of said chloride or chlorides at room temperature. Among them are acrylic acid and methyl esters thereof, methacrylic acid and methyl esters thereof, acrylamides, vinyl acetate, alkali and alkaline-earth metal salts of allyl or methallyl sulfonic acid, styrene sulfonates, basic vinyl monomers such as vinyl pyridines, vinyl imidazoles, etc., and the like.

The polymerization initiator used in this invention must be able to be dissolved in the saline solvent of the type referred to or at least in the monomer solution containing acrylonitrile monomer and also that the product possibly decomposed therefrom should not be separated from the polymerizing system during the course of polymerization. Among them are radical initiators comprising inorganic oxidizing substances such as hydrogen peroxide, persulfates, chlorates, perchlorates and organic oxidizing substances such as peracetic acid, benzoyl peroxide, and Redox system consisting of said inorganic or organic oxidizing substance in combination with an inorganic reducing substance such as sulfite, metasulfite, thiosulfate, hydrazine, or with an organic reducing substance soluble in aqueous zinc chloride solution.

However, it is known that when the Redox initiator such as persulfite-acidic sulfite system is used it considerably accelerates the polymerization velocity and the activity itself is rapidly decreased. In order to obtain a desired polymer solution by controlling the temperatures, conversions and the like in each reactor, the solution of the initiator, if it is of Redox system, either or both of its two components is preferably supplied not only to the first reactor but also to the second or subsequent reactors.

The initiator referred to above, when it is of Redox system each of the two components respectively, is preferably dissolved previously in the aqueous saline solvent for polymerization or an aqueous solution having the same saline composition and concentration of at least 40% by weight, which mixture solution is continuously fed under pressure by means of a quantitative pump to the reactor. This is for the purpose of preventing any generation of coagulated polymer from the polymer solution in the reactor when the solution is contacted with said initiator solution. However, when hydrogen peroxide is used as the initiator it is not desirable to previously prepare such solution to be supplied under pressure, because mixing of hydrogen peroxide with the saline solution having no monomer to be polymerized will cause generation of oxygen bubbles due to the catalytic action of iron, copper or manganese ions in the saline solution and the supplying of such initiator solution containing oxygen bubbles into the reaction will produce a foamy polymer solution which can not be coagulated into desirable products. Thus hydrogen peroxide is preferably dissolved in pure water treated with an ion exchange resin, and then the aqueous solution should be rapidly and stirringly dissolved in the monomer solution immediately prior to supplying it into the first reaction vessel so that the mixture may be fed under pressure to the reactants without causing the undesirable results as referred to.

The present invention will be explained in more detail and more definitely hereinafter by giving several examples thereof. It is to be noted however that they are given merely for explaining this invention but not for limiting the scope of the invention to said embodiments.

EXAMPLE 1

To 100 parts by weight of a concentrated aqueous solution comprising mainly zinc chloride were added 9 parts by weight of a mixture consisting of 89% by weight of acrylonitrile, 9.5% by weight of methyl acrylate and 1.5% by weight of sodium allylsulfonate. The solution, having a specific gravity at 1.50 at 20° C., was kept at a temperature of 12° C. Such monomer solution was continuously supplied under pressure, together with an aqueous solution of hydrogen peroxide as a polymerization initiator, to the first reaction vessel which constitutes one reactor together with three other vessels respectively connected with pipes and arranged in series. The flow rate is maintained at 1 volume part per hour relative to 3 volume parts of the first vessel, and each of the reactors is provided with a mechanical agitator and a cooling jacket.

Hydrogen peroxide as initiator was added by 0.15 part by weight relative to 100 parts by weight of monomers contained in the monomer solution. The reaction temperature in the first vessel was kept at 42° C. while holding the jacket temperature at 25° C. The average time during which the reaction mixture is kept in the first vessel was 180 minutes. From the first reactor in which the average conversion of polymerization was 70% based on the initial monomer concentration of the solution after being mixed with the initiator, the partially polymerized solution was continuously fed to the second vessel, of which the capacity is 0.5 volume part relative to 3 volume parts of the first vessel.

The reaction was continuously carried out in said second vessel at a temperature of 43° C. for an average staying time of 30 minutes. The jacket temperature was kept at 30° C. The total conversion of the reaction mixture continuously taken out of the second vessel was increased up to 75% and the ball-fall viscosity thereof was 80 seconds at 45° C., where it was represented as the falling time of steel ball of ⅛ inch diameter in a vertical distance of 20 cm. in the solution to be measured.

The polymerization was further carried out in a third vessel of which the capacity is 1.5 volume parts relative to 3 volume parts of the first vessel, for 90 minutes while holding the jacket temperaturer at 30° C. The total conversion of the reaction mixture continuously transferred into the fourth vessel was 90%.

In the fourth vessel the polymerization was continued at 45° C. for 180 minutes with the jacket temperature at 48° C. so as to increase the final conversion up to 95%. This polymer solution was continuously taken out of said vessel and in situ spun into a coagulating bath to obtain colorless fibers having excellent physical properties. The final polymer solution had 85±2 seconds of ball-fall viscosity as measured in accordance with the method described above and a transparency of above 65%, measured with a cell of 20 mm. depth at a wave length of 420 mµ. Despite the long run operation, there was found no formation of gel-like substance and the jacket temperatures could be kept constant without any trouble. By spinning the resulting polymer solution in situ and continuously into a coagulating bath, fibers of good quality were obtained. The physical properties, dyeability and other characteristics of the resulting fiber were found to be satisfactorily constant over an extended period of continuous production.

In contrast with the above operation, the same reaction mixture was polymerized under similar conditions except that said monomer solution was kept at a temperature of 20° C., instead of 12° prior to being supplied to the first reactor. In this case, the jacket water temperature of the first reactor was at 13° C. for several days after starting the operation, but it had to be gradually lowered to about 10° C. after three weeks of continuous operation, and after five weeks it was lowered to 6° C. in order to keep the set temperature in the first vessel at 42° C. Furthermore, the polymerization temperature began to fluctuate irregularly, which was accompanied by discoloration of the polymer solution with many small pieces of gel-like polymer being formed. When the operation was stopped to observe the inside of the reaction vessels, discolored gel-like polymer was found deposited over all the inner surface of the first and second vessels.

EXAMPLE 2

The monomer solution prepared as in Example 1 was continuously supplied under pressure, together with ammonium persulfate in amount of 1 part by weight relative to 100 parts by weight of monomer contained in the monomer solution, at a rate of 1 volume part per hour at a temperature of 80° C. into the first vessel of which the capacity is 1.5 volume parts constituting the reactor, together with 0.5 volume parts capacity of second, 0.35 volume parts capacity of third and 3 volume parts capacity of fourth vessels respectively connected with pipes and arranged in series.

The reaction temperature in said first reactor was 50° C., the jacket temperature kept at 40° C. and the average staying time of the reaction mixture was 90 minutes.

The partially polymerized solution was continuously taken out of the first reactor and fed into the second reactor, with the conversion being 74%.

The reaction was continued at 55° C. in said second reactor with the jacket temperaturre at 37° C. wherein the reaction mixture was kept at an average of staying time for 30 minutes. The conversion of the mixture which is continuously taken out of the second vessel and fed to the third vessel reached 83%.

In the third reactor the reaction temperature was kept at 60° C. and the mixture kept for 20 minutes whereby the jacket temperature was raised to 72° C. The conversion of the mixture being continuous fed to the fourth reactor was 92%.

In the fourth reactor the reaction was continued at 60° C. with a jacket temperature of 45° C. for 180 minutes so as to complete the polymerization.

The ball-fall viscosity of the resulting polymer solution at 60° C., measured as in Example 1, was 50 seconds. The transparency thereof was above 60%, measured as in Example 1.

The clearance of the fibers obtained from this polymer solution was good and there was recognized no deterioration of the resulting polymer properties.

Despite the long-run and continuous opeartion, the polymerization could be carried out quite stably. The conversion, viscosity and transparency of the resulting polymer solution were satisfactory.

A polymer solution with constant molecular weight was continuously manufactured without any formation of gel-like substance and without fluctuation of the reaction temperatre. By spinning this polymer solution, fibers with good properties were obtained.

In contrast with the above operation, continuous polymerization was carried out under similar conditions, except that the monomer solution temperature before introduction into the first reactor was controlled to 18° C. instead of 8° C. In this case, the jacket temperature of the first reactor was at 16° C. for several days after starting the operation, but it had to be lowered after two weeks in order to maintain the polymerization temperature in the first reactor at 50° C. and after four weeks to 7-8° C. At this time, many small gel-like and colored polymer pieces were observed in the polymer solution. By stopping the operation and observing the inside of the reactors, yellow-brown, gel-like polymer was found thickly deposited over all the inner surface of the first and second vessels as well as the connecting pipe between them. The polymer solution was, after filtration of said gel-like polymer, subjected to spinning operation to form fibers, but the constancy of quality of fiber with its production time was not good in comparison with those obtained from the operation referred to previously.

EXAMPLE 3

To a 58% aqueous solution of zinc chloride at 0.8 pH value, was added a monomer mixture so that the concentration of said mixture was 10% by weight and which comprised acrylonitrile, methyl acrylate and sodium allylsulfonate in weight proportion of 90:9:1. The resulting monomer solution was cooled to 6° C. Then this monomer solution was supplied to the first reactor at a rate of 9.5 volume parts per hour relative to 3 parts capacity of said first reactor of which the temperature was kept at 50° C. The second and third reactors were of the same capacity as that of the first and kept respectively at temperatures of 53° and 55° C. With using both sodium persulfate and sodium pyrrosulfate as a redox initiator, the conversions as shown in Table 1 were attained under the conditions referred to herein. The jacket temperatures of the first, second and third reactors were respectively kept at 32°, 37° and 52° C. The initiator components were individually dissolved in 45% aqueous solution of zinc chloride in such concentration as to result in near saturation of the solvent with each component, the solution was cooled to 12° C. and then supplied to the reactors in the amounts referred to in Table 1 by means of a quantitative pump.

TABLE 1

| | Amount of initiator (percent) (to monomer) | | Conversion | Average staying time (hours) |
|---|---|---|---|---|
| | Sodium persulfate | Sodium pyrrosulfite | | |
| 1st vessel | 0.15 | 0.50 | 77 | 3.0 |
| 2nd vessel | 0.50 | 0.20 | 97 | 3.0 |
| 3rd vessel | 0 | 0 | 98 | 3.0 |

Distribution of molecular weight in the resulting polymer solution was sharp. Clearness of fibers obtained by spinning the polymer solution in situ in accordance with the usual method was quite good.

Next, in relation to this example, other polymerization operations were carried out similarly except that the charge rate of sodium persulfate to the first reactor was increased and the conversion in the first vessel was controlled at 90-91%. In this case the jacket water temperature for the first reactor was made stable at about 20° C. but the viscosity of the resulting polymer solution fluctuated in comparison with the previous example so that it became difficult to keep the final soltuion viscosity within desired narrow limits. The fiber tow obtained by spinning the resulting polymer solution was not desirable since fluffiness was caused and the dyeability thereof was different part by part.

On the other hand, when the first reactor was kept at 65° C. and 0.70% sodium persulfate and 0.70% sodium pyrrosulfite were fed thereto, the conversion reached 98% in this vessel. However, this polymer solution was inferior to that prepared according to the present invention as shown in Table 2.

TABLE 2

| | Dope transparency at 42 m, percent | Whiteness of fibers | CN group hydrolized in polymer, mol percent |
|---|---|---|---|
| This invention | 82 | 0.780 | 0.01 |
| 65° polymerization | 60 | 0.530 | 0.20 |

In this case the viscosity of the resulting polymer solution fluctuated which was controlled with difficulty.

EXAMPLE 4

The material solution prepared as in Example 3 was similarly supplied at 1.9 volume parts per hour to the reactor, to which the redox initiator was added as shown in Table 3. The reaction temperature and the jacket temperatures were as in Example 3, except that the reaction temperature for the third reactor was 42° C.

TABLE 3

| | Amount of initiator (percent) (to monomer) | | Conversion (percent) | Average staying time (hours) |
|---|---|---|---|---|
| | Ammonium persulfate | Sodium pyrrosulfite | | |
| 1st vessel | 0.13 | 0.5 | 72 | 1.5 |
| 2nd vessel | 0.4 | 0.2 | 88 | 1.5 |
| 3rd vessel | 0.2 | 0.1 | 96 | 1.5 |

In accordance with the conditions as referred to above, the polymerization could be continuously carried out stably and homogeneously with similarly satisfiable results.

What is claimed is:

1. In a continuous process for the production of an acrylic polymer solution from a mono-ethylenically unsaturated monomer solution comprising at least 85% by weight of acrylonitrile monomer in a concentrated aqueous salt solution comprising zinc chloride, an improvement comprising:
   (1) precooling the monomer solution to a temperature of 5–15° C.,
   (2) continuously feeding the pre-cooled monomer solution, together with a polymerization initiator solution into the first of a plurality of series connected reaction zones, each of said reaction zones being maintained at a temperature of 35°–65° C., with the proviso that each successive reaction zone be at a temperature above that of the preceding reaction zone, each of said reaction zones being provided with a cooling means for cooling the reaction zones with the further proviso that each cooling means be at a temperature which is above 15° C. and the difference between the temperature of each cooling means and its associated reaction zone is within 30° C. to effect polymerization of the monomer in the first reaction zone to form a reaction mixture in which the extent of monomer conversion is 60–85%, and (3) transferring the reaction mixture to at least one next succeeding reaction zone to continue the polymerization to a final conversion of at least 92%.

2. A process as claimed in claim 1 comprising additionally feeding the polymerzation initiator to at least one of the plurality of reaction zones other than the first.

3. A process as claimed in claim 1, wherein the polymerization is carried out so as to yield a solution having a polymer concentration of from 7 to 11% by weight, and which is suitable for extrusion.

4. A process as claimed in claim 1, wherein the polymerization temperature in each successive reaction zone is higher by 5° C. than the temperature in the preceding reaction zone.

5. A process as claimed in claim 1, wherein the zinc chloride solution further contains a chloride of sodium, magnesium or calcium, or a mixture or two or more of said chlorides.

6. A process as claimed in claim 1, wherein the monomer solution comprises at least one member of the group consisting of acrylic acid, the methyl ester thereof, methacrylic acid, the methyl ester thereof, acrylamide, vinyl acetate, alkalimetal and alkaline-earth metal salts of allyl and methallyl sulfonic acids, styrene sulfonates and basic vinyl monomers.

7. A process as claimed in claim 1, wherein the polymerization initiator is dissolved in an aqueous solution containing at least 40% by weight of zinc chloride or a mixture of zinc chloride and a chloride of an alkali or alkaline-earth metal before the polymerization.

8. A process as claimed in claim 1, wherein the polymerization initiator is dissolved in an aqueous solution containing at least 40% by weight of zinc chloride or of a mixture of zinc chloride and a chloride of an alkali or alkaline-earth metal before the polymerization.

9. A process as claimed in claim 1, wherein the polymerization initiator is a redox initiator and at least one of its two components is added to the second or a subsequent reaction zone.

References Cited
UNITED STATES PATENTS

| | | |
|---|---|---|
| 2,775,579 | 12/1956 | Erchak et al. _____ 260—85.5 X |
| 3,135,812 | 6/1964 | Taniyama et al. |
| 3,252,950 | 5/1966 | Terenzi et al. |
| 3,320,221 | 5/1967 | Wishman et al. |

HARRY WONG, JR., Primary Examiner

U.S. Cl. X.R.

260—79.3, 85.5, 88.7